(12) United States Patent
Johnston

(10) Patent No.: US 6,797,798 B2
(45) Date of Patent: Sep. 28, 2004

(54) SPRAY POLYUREA COATING SYSTEMS

(75) Inventor: Jay A. Johnston, Clinton Township, MI (US)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/400,740

(22) Filed: Mar. 27, 2003

(65) Prior Publication Data

US 2003/0212237 A1 Nov. 13, 2003

Related U.S. Application Data

(63) Continuation of application No. PCT/US01/30886, filed on Oct. 2, 2001.
(60) Provisional application No. 60/275,928, filed on Mar. 15, 2001, and provisional application No. 60/237,303, filed on Oct. 2, 2000.

(51) Int. Cl.[7] .................. C08G 18/76; C08G 18/32; C08G 18/10; C08K 5/15
(52) U.S. Cl. .................. 528/60; 524/280; 524/729; 528/61; 528/67; 528/68
(58) Field of Search ................ 524/280, 729; 528/60, 61, 68

(56) References Cited

U.S. PATENT DOCUMENTS

| | | | |
|---|---|---|---|
| 4,448,904 A | 5/1984 | Dominguez | 521/160 |
| 4,701,476 A | * 10/1987 | Burchell et al. | 521/159 |
| 4,891,086 A | 1/1990 | Austin et al. | 156/296 |
| 5,013,813 A | 5/1991 | Zimmerman et al. | 528/60 |
| 5,118,728 A | 6/1992 | Primeaux | 523/315 |
| 5,124,426 A | 6/1992 | Primeaux, II et al. | 528/60 |
| 5,153,232 A | 10/1992 | Primeaux, II | 521/110 |
| 5,266,671 A | 11/1993 | Primeaux, II | 528/68 |
| 5,317,076 A | 5/1994 | Primeaux, II | 528/61 |
| 5,731,397 A | 3/1998 | Primeaux, II et al. | 528/73 |
| 5,962,618 A | 10/1999 | Primeaux, II et al. | 528/61 |
| 6,013,755 A | 1/2000 | Primeaux, II et al. | 528/68 |

FOREIGN PATENT DOCUMENTS

| | | |
|---|---|---|
| EP | 0 588 202 A1 | 3/1994 |
| EP | 0 657 481 A1 | 6/1995 |
| EP | 0 802 209 A1 | 10/1997 |
| JP | 3160016 | 10/1991 |
| WO | WO 99 65614 | 12/1999 |

OTHER PUBLICATIONS

Primeaux, D.J., II, "Spray Polyurea Versatile High Performance Elastomer for the Polyurethane Industry", Polyurethanes 89: Proceedings of the SPI 32nd Annual Technical/Marketing Conference, Oct. 1–4, 1989, pp. 126–130.

"New Product Belongs at Garbage Dump", Polymer News, Apr. 1996, pp. 137–138, vol. 21, No. 4, Gordon and Breach Science Publishers SA.

"Isocyanate", Adhesives Age, Oct. 1995, p. 10, vol. 38, No. 11.

"Isocyanate", Rubber World, Sep. 1995, p. 52, vol. 212, No. 6, Lippincott & Peto.

Primeaux, D.J., "Polyurea Spray: A Solution of the Future?", Plastiques Modernes et Elastomeres, Oct. 1993, pp. 66–68, vol. 45, No. 8.

* cited by examiner

Primary Examiner—Rabon Sergent
(74) Attorney, Agent, or Firm—Nicole Graham

(57) ABSTRACT

Spray polyurea elastomers and reaction systems and methods for making the same. The spray polyurea elastomers are prepared with a prepolymer formed by reacting a low 2,4'-isomer content MDI with an MDI reactive component. This prepolymer is blended with a high 2,4'-isomer content MDI to form a quasi-prepolymer. The quasi-prepolymer is reacted with an amine resin to form polyurea elastomers.

21 Claims, No Drawings

SPRAY POLYUREA COATING SYSTEMS

CROSS REFERENCE TO RELATED APPLICATIONS

This application claims the benefit of U.S. Provisional Application No. 60/275,928, filed on Mar. 15, 2001, and U.S. Provisional Application No. 60/237,303, filed on Oct. 2, 2000, the subject matter of which are herein incorporated by reference. This application is a continuation of international application PCT/US01/30886, filed Oct. 2, 2001.

BACKGROUND OF THE INVENTION

Spray polyurea systems can be prepared by mixing or combining together a diphenylmethane diisocyanate ("MDI")-containing prepolymer and at least one amine resin. Spray polyurea systems prepared from MDI-containing prepolymers having a 2,4' MDI-isomer content of about greater than or equal to 25% by weight, and, more preferably, greater than or equal to 30% by weight (hereinafter "high 2,4'-isomer MDI") have several characteristics that coating applicators find attractive. The high 2,4'-isomer MDI content prepolymers have increased storage stability, lower viscosities, and slower reactivity. The slower reactivity allows the spray applicators to use less expensive equipment to spray the polyurea coatings. Spray polyurea coatings prepared with high 2,4'-isomer MDI content prepolymers possess a smoother surface, increased elongation and lower modulus. High 2,4'-isomer MDI content prepolymers also have some negative effects on spray polyurea systems. The coatings obtained from such systems have lower tensile strength and lower tear resistance than coatings prepared from relatively low 2,4'-isomer MDI content prepolymers. The high 2,4'-isomer MDI coatings also develop physical properties at a slower rate.

Coating formulators currently blend a relatively low NCO prepolymer with a high 2,4'-isomer MDI and optionally propylene carbonate to obtain a "quasi-prepolymer." This blend solves several processing problems. The low NCO prepolymer generally is prepared from a difunctional MDI and a difunctional polyol. The high 2,4'-isomer MDI that is blended with the low NCO prepolymer may often have a 2,4'-isomer content of about 30 to 56% by weight, preferably about 50 to 56% by weight, and more preferably about 56% by weight. This method of blending prepolymers is currently the preferred method in the industry. The quasi-prepolymer is then combined or mixed with at least one amine resin to form the spray polyurea system. The initial low NCO prepolymers are generally made from a base MDI isocyanate having a 2,4'-MDI content of at least about 25% by weight of the base isocyanate.

Uretonimine modified MDI has also been used to solve processing problems. A prepolymer made from uretonimine modified MDI with propylene carbonate back-added has increased gel and tack free times. With the exception of elongation, this prepolymer, when combined with at least one amine resin, produces excellent polyurea coatings.

SUMMARY OF THE INVENTION

The present invention relates to spray polyurea elastomers and systems and methods for making the same. The spray polyurea systems are prepared by a method comprising the steps:

A) providing a first isocyanate composition of at least one diphenylmethane diisocyanate isomer, the composition containing greater than 75% by weight 4,4'-MDI;

B) providing a first isocyanate reactive organic material of one or more compounds containing a plurality of isocyanate reactive groups;

C) providing a second isocyanate composition of a mixture of two or more diphenylmethane diisocyanate isomers, wherein the mixture contains at least 25% by weight of 2,4'-MDI;

D) forming an isocyanate group terminated intermediate prepolymer by reacting the first isocyanate reactive organic material with a stoichiometric excess of the first isocyanate composition, wherein the prepolymer contains from 1 to 13% by weight of free isocyanate groups;

E) mixing the intermediate prepolymer with the second isocyanate composition to produce a blended quasiprepolymer composition having a final free isocyanate group content of from 12 to 28% by weight;

F) providing a second isocyanate reactive organic material comprising at least one compound which contains two or more isocyanate reactive amine groups; and G) combining the quasiprepolymer composition and the second isocyanate reactive material under conditions suitable for the formation of an elastomer comprising a plurality of urea linkages.

DETAILED DESCRIPTION OF THE INVENTION

The spray polyurea systems generally are prepared by combining or mixing together an "A" component and a "B" component, usually referred to as the "A side" and the "B side". Because of the fast reactivity of an isocyanate and a primary amine, the A and B components should not be mixed together until they reach the spray gun.

The A component includes a prepolymer formed by reacting a low 2,4'-isomer content MDI containing greater than 75% by weight 4,4'-MDI, with an MDI reactive component containing a plurality of isocyanate reactive groups. Preferably, the low 2,4'-isomer content MDI is a relatively pure MDI (as used herein "pure MDI" means MDI having a 2,4'-isomer content of about 1 to 2% by weight, balance 4,4'-isomer). In an aspect of the invention, the low 2,4'-isomer content MDI has a 2,4'-isomer content of less than 25% by weight.

The MDI reactive component is usually a polyol, and any suitable polyol may be used to form desirable prepolymers. For example, the MDI reactive component may comprise at least one material selected from polyols, polyamines, compounds containing both amine and alcohol groups, and mixtures of these. Preferred polyols include polyether diols and triols with number averaged molecular weights of from about 1,000 to about 10,000, with diols being particularly preferred. In an aspect of the invention the MDI reactive component contains at least 75% by weight of one or more nominal diols. Generally, when preparing the prepolymer, excess MDI is reacted with polyol to form an about 5 to 13% NCO content prepolymer.

After forming the prepolymer, a second isocyanate composition containing a mixture of two or more diphenylmethane diisocyanate isomers with at least 25% by weight 2,4'-isomer content MDI is blended with the prepolymer to form the A component quasiprepolymer. In an aspect of the invention, the second isocyanate composition can have a 2,4'-isomer content of greater than or equal to about 35% by weight, preferably from about 35 to 56% by weight, more preferably from about 50 to 56% by weight, and even more preferably about 56% by weight. Generally, the second isocyanate composition is added to increase the NCO content of the final product to a final free —NCO content of between about 12 and 23%.

Additives and the like may be added to the A component, depending on desired end properties, processing considerations, etc. For example, it may be desirable to add at least some non-volatile liquid non-isocyanate-reactive diluent such as an alkylene carbonate. Specific examples of suitable alkylene carbonates include, but are not limited to, ethylene carbonate, propylene carbonate, butylene carbonate, dimethyl carbonate, and the like. Propylene carbonate is preferred. The amounts and types of additives added will vary, as those skilled in the art will understand.

The B component includes any suitable amine resin. Suitable amine resins are disclosed in, for example, U.S. Pat. Nos. 5,962,618 and 6,013,755 and may be the same or different from the MDI reactive component used in the A component. Particularly suitable amine resins include, for example, JEFFAMINE® D-2000 amine, JEFFAMINE® T-5000 amine (both available from Huntsman Petrochemical Corporation), ETHACURE® 100 resin (available from Albemarle Corporation, Baton Rouge, La.), UNILINK® 4200 crosslinker, UNILINK® 4100 crosslinker (both available from UOP, Des Plaines, Ill.), and mixtures of these. At least some polyether polyol may also be added to the amine resin to form a blend. These blends are known and are used in the spray polyurea industry to produce "hybrid polyurea systems."

In an aspect of the invention, the B component contains greater than 50% by weight of compounds containing isocyanate reactive amine groups, and, more preferably it consists essentially of compounds containing isocyanate reactive amine groups.

Further, the MDI reactive material may consist predominately of amine terminated polyether resins by weight, the amine terminated polyether resin having a number averaged molecular weight of 2,000 or greater and containing primary or secondary amine termini. Moreover, in an aspect of the invention, the amine terminated polyether resin can have number averaged molecular weights of from 2,000 to 5,000 and isocyanate reactive terminal groups of predominately primary amine groups. In a further aspect, the amine terminated polyether resins can consist by weight predominately of diamines or triamines. The MDI reactive material can also further contain by weight at least some (i.e., minor amounts) of a relatively low molecular weight diamine chain extender containing predominately primary or secondary amine groups.

Preferably, the A component and the B component are employed in a 1:1 volume ratio. Other volume ratios may also be useful.

Moreover, in an aspect of the invention the A component and the B component can be processed as a two component system at an A:B weight ratio of from 60:40 to 40:60. Further, the ratio of isocyanate groups to isocyanate reactive groups in such a two component system can be from 0.9 to 1.15.

The polyurea spray systems can be prepared from high pressure impingement mixing of the A component and the B component. Such processes are well known to the skilled artisan.

A series of coatings was prepared and tested to evaluate the effects of 2,4'-isomer MDI on spray polyurea systems. It was observed that polyurea coatings prepared from a spray system formed with a prepolymer containing pure MDI as base isocyanate had a much higher tensile strength and tear resistance than coatings prepared from polyurea spray systems prepared from a prepolymer containing 50% by weight 2,4'-isomer MDI as the base isocyanate. While the coating obtained from the polyurea system prepared with the pure MDI-based prepolymer gave the best physical properties when sprayed as a coating, the prepolymer itself was unstable at room temperature and tended to crystallize at room temperature.

From this data it was observed that a prepolymer with a higher pure MDI content would have better physical properties. It was discovered that if a prepolymer is prepared with a high pure MDI content as the base isocyanate and then back blended with an MDI with a high 2,4'-isomer content to form a quasi-prepolymer, then a polyurea spray system coating could be prepared with both low reactivity and high physical properties. Quasiprepolymers prepared in this manner are usually storage stable liquids at room temperature (25° C.), like the prepolymers used in prior art spray polyurea systems.

Although it is less desirable, it is within the scope of the invention to use prepolymers that are not stable liquids at room temperature (25° C.).

Glossary:

1. JEFFAMINE® D-2000 amine: A 2000 MW aliphatic primary amine terminated polyoxypropylene diamine, available commercially from Huntsman Petrochemical Corporation.

2. ETHACURE® 100 amine: An 80:20 mixture of 3,5-diethyl-2,4-toluenediamine and 3,5-diethyl-2,6-toluenediamine, commercially available from Albemarle Corporation.

3. RUBINATE® 9009 prepolymer: A quasiprepolymer based on a uretonimine modified mixture of 4,4'-MDI and 2,4'-MDI (with an isomer ratio of about 98:2), commercially available from Huntsman Polyurethanes. This quasiprepolymer has a free isocyanate group content of about 15.6%.

4. RUBINATE® 9480 prepolymer: A quasiprepolymer based on a mixture of 4,4'-MDI and 2,4'-MDI, commercially available from Huntsman Polyurethanes. This quasiprepolymer has a free isocyanate group content of about 15.0% by weight 5. Silane A-187: A silane adhesion promoter, commercially available from Witco (OSi Division).

The following examples are provided to further illustrate the features of the present invention and should not be construed as limiting thereof.

EXAMPLES

Example 1

A prepolymer was prepared from MDI having about 10% by weight 2,4'-isomer and about 90% by weight 4,4'-isomer (18.53% by weight) and a difunctional, ethylene oxide capped, polyether polyol (41.47% by weight) with a hydroxyl number of 40. This prepolymer was back blended with propylene carbonate (10% by weight) and MI-50, a 1:1 weight ratio mixture of 4,4'-MDI and 2,4'-MDI from Huntsman Polyurethanes (30% by weight) to form a quasi-prepolymer. All weights are based on the total final weight of the quasi-prepolymer. The quasi-prepolymer had an NCO content of 15.1% and a viscosity of about 350 cps at 25° C. The quasi-prepolymer also had an overall 2,4'-isomer content of about 35% by wt. This prepolymer was sprayed with a B-component to make a polyurea coating (Polyurea Coating I). The B-component was composed of JEFFAMINE® D-2000 amine resin (74.7 wt. % of B-component) and ETHACURE® 100 amine resin (25.3 wt. %). This polyurea spray system was compared to another polyurea spray system prepared utilizing a commercially available prepolymer of similar composition, but having an overall 2,4'-MDI content of less than 2% by weight. This commercial prepolymer is RUBINATE® 9009 prepolymer, and is not a prepolymer according to the invention. Ten percent by weight propylene carbonate was added to the RUBINATE® 9009 prepolymer before spraying with the B component (Polyurea Coating II). The B-component was composed of JEFFAMINE® D-2000 amine resin (74.7 wt. % of B-component) and ETHACURE® 100 amine resin (25.3 wt. %). The propylene carbonate slows the reactivity of the A and B components. The reactivity data for (gel and tack-free time), tensile strength, maximum elongation, and tear resistance properties Polyurea Coating I and Polyurea Coating II are shown in Table I.

TABLE I

|  | Polyurea Coating I | Polyurea Coating II |
|---|---|---|
| Gel/Tack (s) | 4.3/8.0 | 4.5/7.3 |
| Tensile (psi) | 3501 | 2932 |
| Elongation (%) | 428 | 217 |
| Tear (pli) | 566 | 441 |

It is believed that the physical properties of Polyurea Coating I are at least comparable to the best combination of physical properties measured for any sprayed polyurea coating in the prior art.

The coatings from Example 1 were sprayed onto a plastic panel coated with a mold release. The coatings were removed from the plastic panels by gently pulling on one corner of the coating.

Not only does this invention improve the performance of spray polyurea coatings, it also reduces the quantity of 2,4'-isomer MDI required by the plant manufacturing the prepolymer.

Example 2

A prepolymer (Prepolymer III) was prepared from MDI having about 10% by weight 2,4'-isomer and about 90% by weight 4,4'-isomer (28.09% by weight) and a difunctional, polyoxypropylene polyether polyol (46.5% by weight) with a hydroxyl number of 56. This prepolymer was back blended with MI-50, a 1:1 weight ratio mixture of 4,4'-MDI and 2,4'-MDI from Huntsman Polyurethanes, (25.41% by weight) to form a quasi-prepolymer. All weights are based on the total final weight of the quasi-prepolymer. The quasi-prepolymer had an NCO content of 15.7% and a viscosity of about 898 cps at 25° C. The quasi-prepolymer also had an overall 2,4'-isomer content of about 15.5%.

A second prepolymer (Prepolymer IV) was prepared from MDI having about 2% by weight 2,4'-isomer and about 98% by weight 4,4'-isomer (28.09% by weight) and a difunctional, polyoxypropylene polyether polyol (46.5% by weight) with a hydroxyl number of 56. This prepolymer was back blended with MI-50, a 1:1 weight ratio mixture of 4,4'-MDI and 2,4'-MDI from Huntsman Polyurethanes, (25.41% by weight) to form a quasi-prepolymer. All weights are based on the total final weight of the quasi-prepolymer. The quasi-prepolymer had an NCO content of 15.9% and a viscosity of about 825 cps at 25° C. The quasi-prepolymer also had an overall 2,4'-isomer content of about 13.3%.

A third prepolymer (Prepolymer V) was prepared from MDI having about 30% by weight 2,4'-isomer and about 70% by weight 4,4'-isomer (28.09% by weight) and a difunctional, polyoxypropylene polyether polyol (46.5% by weight) with a hydroxyl number of 56. This prepolymer was back blended with MI-50, a 1:1 weight ratio mixture of 4,4'-MDI and 2,4'-MDI from Huntsman Polyurethanes, (25.41% by weight) to form a quasi-prepolymer. All weights are based on the total final weight of the quasi-prepolymer. The quasi-prepolymer had an NCO content of 15.7% and a viscosity of about 919 cps at 25° C. The quasi-prepolymer also had an overall 2,4'-isomer content of about 21.1%.

These prepolymers (Prepolymers III, IV, and V) were reactively processed into sprayed polyurea elastomers by using the B-component indicated below to make polyurea coatings (Polyurea Coatings III, IV, and V). This B-component was composed of JEFFAMINE® D-2000 amine resin (52.3 wt. % of B-component), JEFFAMINE® T-5000 amine resin (10.46 wt. %), ETHACURE® 100 amine resin (26.15 wt. %), Silane A-187 (0.84 wt. %), and titanium dioxide powder (10.25 wt. %).

These polyurea spray systems were compared to a polyurea sprayed system (Polyurea Coating VI) prepared utilizing a commercially available prepolymer of similar composition. This commercial prepolymer is RUBINATE® 9480 prepolymer, and it is not according to the invention. The B-component was composed of JEFFAMINE® D-2000 amine resin (52.3 wt. % of B-component), JEFFAMINE® T-5000 amine resin (10.46 wt. %), ETHACURE® 100 amine resin (26.15 wt. %), Silane A-187 (0.84 wt. %), and titanium dioxide powder (10.25 wt. %).

As shown in Table II, Polyurea Coating III had the highest tensile strength and a higher maximum elongation compared to Polyurea Coatings IV and V. Moreover, tear resistance was improved.

The physical properties of Polyurea Coating III were also compared to the physical properties of Polyurea Coating VI. The maximum elongation and tear resistance of Polyurea Coating III were slightly lower for Polyurea Coating VI.

TABLE II

|  | Polyurea Coating III | Polyurea Coating IV | Polyurea Coating V | Polyurea Coating VI |
|---|---|---|---|---|
| Gel/Tack (s) | 4/6 | 4.5/6.5 | 3.5/5.5 | 4.5/7.5 |
| Tensile (psi) | 3195 | 2512 | 1766 | 3201 |
| Elongation (%) | 286 | 277 | 257 | 342 |
| Tear (pli) | 410 | 386 | 371 | 460 |
| Hardness A/D | 87/47 | 93/44 | 86/43 | 87/46 |
| Flexural Modulus (psi) | 42213 | 38893 | 37432 | 44955 |
| $H_2O$ Absorb. (%) | 1.92 | 1.83 | 1.88 | 2.23 |
| Impact (ft x Lbs) | 9.59 | 8.65 | 6.76 | 16.27 |

The coatings of these examples were sprayed onto a plastic panel coated with a mold release. The coatings were removed from the plastic panels by gently pulling on one corner of the coating.

Not only does this invention improve the performance of spray polyurea coatings; it also reduces the quantity of 2,4'-isomer MDI required by the plant manufacturing the prepolymer.

What is claimed:

1. A spray polyurea elastomer comprising the reaction product of:
   (a) a blended quasiprepolymer composition comprising:
      (i) an Intermediate prepolymer comprising the reaction product of:
         (a) a first isocyanate composition comprising at least one diphenylmethane diisocyanate isomer that contains greater than 75% by weight 4,4'-MDI, and (b) a first isocyanate reactive organic material comprising one or more compounds containing a plurality of isocyanate reactive groups, wherein the intermediate prepolymer contains from 1 to 13% by weight of free isocyanate groups; and (ii) a second isocyanate composition comprising a mixture of two or more diphenylmethane diisocyanate isomers that contains at least 25% by weight of 2,4'-MDI, wherein, the blended quasiprepolymer composition has a final free isocyanate group content of from 12 to 28% by weight; and (b) a second isocyanate reactive organic material comprising at least one compound that contains two or more isocyanate reactive amine groups.

2. The spray polyurea elastomer of claim 1, wherein the intermediate prepolymer contains from 5 to 13% by weight of free isocyanate groups, and the blended quasiprepolymer composition contains from 12 to 23% by weight of free isocyanate groups.

3. The spray polyurea elastomer of claim 1, wherein the first isocyanate composition contains at least 98% by weight of 4,4'-MDI and the second isocyanate composition contains 35% or more by weight of 2,4'-MDI.

4. The spray polyurea elastomer of claim 3, wherein the second isocyanate composition contains 50 to 56% a by weight of 2,4'-MDI and at least 40% by weight of 4,4'-MDI.

5. The spray polyurea elastomer of claim 1, wherein the second isocyanate reactive organic material contains greater than 50% by weight of compounds containing isocyanate reactive amine groups.

6. The spray polyurea elastomer of claim 5, wherein the second isocyanate reactive organic material consists essentially of compounds containing isocyanate reactive amine groups.

7. The spray polyurea elastomer of claim 1, wherein the first isocyanate reactive organic material consists essentially of one or more members selected from the group consisting of polyols, polyamines, compounds containing both amine and alcohol groups, and mixtures of these.

8. The spray polyurea elastomer of claim 7, wherein the first isocyanate reactive organic material consists essentially of one or more polyols.

9. The spray polyurea elastomer of claim 8, wherein the first isocyanate reactive material consists essentially of one or more nominal diols or triols having number averaged molecular weights of from 1.000 to 10,000.

10. The spray polyurea elastomer of claim 1, wherein the second isocyanate reactive organic material consists predominantly of amine terminated polyether resins, by weight, having number averaged molecular weights of 2,000 or greater and containing primary or secondary amine termini.

11. The spray polyurea elastomer of claim 10, wherein the amine terminated polyether resins have number averaged molecular weights of from 2,000 to 5,000 and wherein the isocyanate reactive terminal groups are predominantly primary amine groups.

12. The spray polyurea elastomer of claim 11, wherein the amine terminated polyether resins consist predominantly of diamines or triamines by weight.

13. The spray polyurea elastomer of claim 1, wherein the blended quasiprepolymer composition and the second isocyanate reactive organic material are processed as a two component system at a component weight ratio of from 60:40 to 40:60.

14. The spray polyurea elastomer of claim 1, wherein the blended quasiprepolymer composition, the second isocyanate reactive organic material, or both further comprise an alkylene carbonate.

15. The spray polyurea elastomer of claim 14, wherein the alkylene carbonate is selected from the group consisting of ethylene carbonate, propylene carbonate, butylene carbonate, and dimethyl carbonate.

16. The spray polyurea elastomer of claim 15, wherein the alkylene carbonate is propylene carbonate.

17. A reaction system for preparing spray polyurea elastomers comprising:

(a) a blended quasiprepolymer composition comprising:

(i) an intermediate prepolymer comprising the reaction product of:

(a) a first isocyanate composition comprising at least one diphenylmethane diisocyanate isomer that contains greater than 75% by weight 4,4'-MDI, and (b) a first isocyanate reactive organic material comprising one or more compounds containing a plurality of isocyanate reactive groups, wherein the intermediate prepolymer contains from 1 to 13% by weight of free isocyanate groups: and (ii) a second isocyanate composition comprising a mixture of two or more diphenylmethane diisocyanate isomers that contains at least 25% by weight of 2,4'-MDI, wherein, the blended quasiprepolymer composition has a final free isocyanate group content of from 12 to 28% by weight; and (b) a second isocyanate reactive organic material comprising at least one compound that contains two or more isocyanate reactive amine groups.

18. The reaction system of claim 17, wherein the first isocyanate composition contains at least 98% by weight of 4,4'-MDI and the second isocyanate composition contains 35% or more by weight of 2,4'-MDI.

19. The reaction system of claim 18, wherein the second isocyanate composition contains 50 to 56% by weight of 2,4'-MDI and at least 40% by weight of 4,4'-MDI.

20. The reaction system of claim 17, wherein the second isocyanate reactive organic material consists predominantly of amine terminated polyether resins, by weight, having number averaged molecular weights of 2,000 or greater and containing primary or secondary amine termini.

21. The reaction system of claim 1, wherein the blended quasiprepolymer composition, the second isocyanate reactive organic material, or both further comprise an alkylene carbonate.

* * * * *